United States Patent [19]

Kuroda

[11] Patent Number: 4,908,708
[45] Date of Patent: Mar. 13, 1990

[54] LIGHT BEAM SCANNING OPTICAL SYSTEM

[75] Inventor: Muneo Kuroda, Osaka, Japan

[73] Assignee: Minolta Camera Kabushiki Kaisha, Osaka, Japan

[21] Appl. No.: 342,344

[22] Filed: Apr. 24, 1989

[30] Foreign Application Priority Data

May 27, 1988 [JP] Japan ................................. 63-130846
May 27, 1988 [JP] Japan ................................. 63-130847

[51] Int. Cl.$^4$ .......................... H04N 1/29; H04N 3/08
[52] U.S. Cl. .................................... 358/206; 346/160; 358/300; 358/302
[58] Field of Search ....................... 358/206, 300, 302; 346/160

[56] References Cited

U.S. PATENT DOCUMENTS

| | | | |
|---|---|---|---|
| 3,469,030 | 9/1969 | Priebe | 358/206 |
| 3,750,189 | 7/1973 | Felischer | 346/160 |
| 3,946,150 | 3/1976 | Grafton | 358/481 |
| 4,568,982 | 2/1986 | Follett | 358/206 |

FOREIGN PATENT DOCUMENTS

| | | |
|---|---|---|
| 3644124 | 7/1988 | Fed. Rep. of Germany . |
| 54-123040 | 9/1979 | Japan . |
| 55-36127 | 9/1980 | Japan . |
| 61-173212 | 8/1986 | Japan . |

*Primary Examiner*—Howard W. Britton
*Attorney, Agent, or Firm*—Price, Gess & Ubell

[57] ABSTRACT

A cylindrical lens for use in a light beam scanning optical system is arranged to have luminous flux enter a deflection device for converting it into a straight line along a plane perpendicular to a rotation axes of the deflection device. The luminous flux deflected by the deflection device is turned over by the concave surface of a cylindrical mirror or spherical mirror to converge on the surface of a photoconductor through the cylindrical lens. The deflection device with the cylindrical lens and cylindrical mirror or the spherical mirror provided behind the deflection device in the light path fullfills the following equations.

$$|s/R| \geq 0.5$$

$$0.15 < d/|R| < 0.45$$

$$(|d_2| + |d_3|)/|R| < 0.45$$

wherein R is a radius of curvature of the cylindrical mirror or spherical mirror in the direction of deflection, s is a distance from a point of reflection of luminous flux directed toward the center of scanning area by the deflection device to a light collection point after reflection of the deflection device, d is a distance from a point of reflection of luminous flux directed toward the center of scanning area by the deflection device to the mirror, $d_2$ is the thickness of cylindrical lens and $d_3$ is a distance from the plane of projection of cylindrical lens to light collecting surface.

12 Claims, 12 Drawing Sheets

EXPERIMENTAL EXAMPLE I FIG. 4b

EXPERIMENTAL EXAMPLE II FIG. 5b

EXPERIMENTAL EXAMPLE III FIG. 6b

EXPERIMENTAL EXAMPLE IV FIG. 7b

FIG.12a EXPERIMENTAL EXAMPLE V 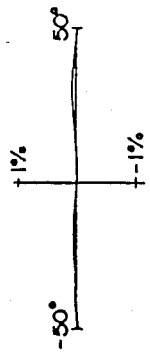

FIG.13a EXPERIMENTAL EXAMPLE VI 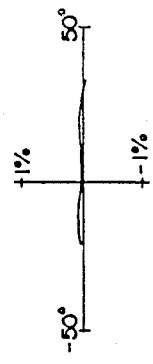

FIG.14a EXPERIMENTAL EXAMPLE VII 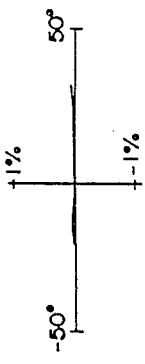

FIG.18a  FIG.18b
EXPERIMENTAL EXAMPLE VIII
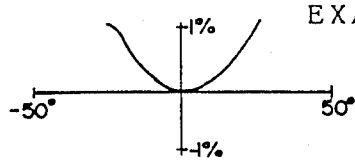
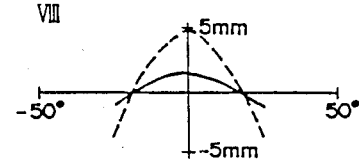
FIG.19a  FIG.19b
EXPERIMENTAL EXAMPLE IX
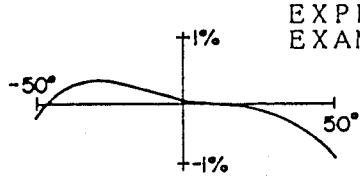
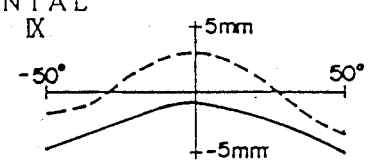
FIG.20a  FIG.20b
EXPERIMENTAL EXAMPLE X
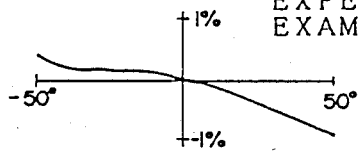
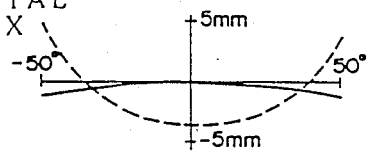
FIG.21a  FIG.21b
EXPERIMENTAL EXAMPLE XI
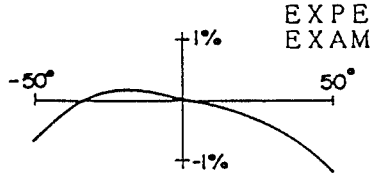
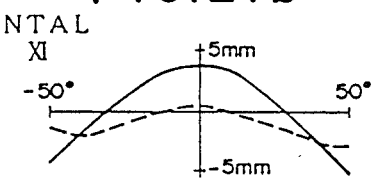
FIG.22a  FIG.22b
EXPERIMENTAL EXAMPLE XII
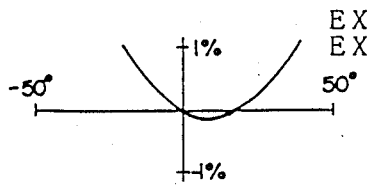
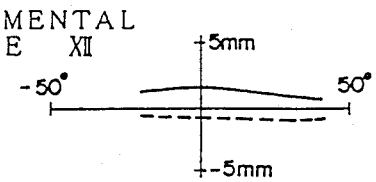

EXPERIMENTAL EXAMPLE XV

EXPERIMENTAL EXAMPLE XIV

EXPERIMENTAL EXAMPLE XV

LIGHT BEAM SCANNING OPTICAL SYSTEM

BACKGROUND OF THE INVENTION

1. Technical Field of the Invention

The present invention relates to a light beam scanning optical system, and more particularly to a structure of a light beam scanning optical system incorporated in laser beam printers, facsimile and the like for deflectively collecting and scanning on a photoconductor a luminous flux which is provided with image information.

2. Brief Description of Related Art

Generally, a light beam scanning optical system utilized in laser beam printers and facsimiles basically comprises a semiconductor laser as a light source, a deflecting means such as a polygon mirror and a galvano mirror, and an fθ lens. The deflecting means is utilized for scanning a luminous flux emitted from the semiconductor laser at an equiangular velocity, however, a homogeneous image can not be obtained since there occurs a difference in the scanning speed over the range from a central portion to both edges in the main scanning direction at the light collecting surface. An fθ lens is therefore provided for rectifying the difference in the scanning speed.

The fθ lens is made by combining various concave lenses, convex lenses and the like, and lens planning is extremely complicated. Because of a number of surfaces to be ground, it is quite hard to improve accuracy in the manufacturing process and the cost is quite expensive. Moreover, there is a limitation in selecting a material which possesses good permeability.

Accordingly, in place of the fθ lens, the use of an elliptical mirror (Japanese Published Unexamined Patent Application No. 123040/1979), the use of parabolic mirror (Japanese Published Examined Patent Application No. 36127/1980) and the use of a concave reflector (Japanese Published Unexamined Patent Appliation No. 173212/1986) have heretofore been proposed. However, there are difficulties in manufacturing the elliptical mirror and parabolic mirror with further difficulty in obtaining high manufacturing accuracy.

When the concave reflector is used, it is necessary to prepare the same length of a concave reflector as that of the main scanning direction since the reflected light is being collected in the direction perpendicular to the surface of a photoconductor thereby causing the optical system itself to become impracticably large in size.

SUMMARY OF THE INVENTION

The main object of the present invention is to provide an inexpensive and compact light beam scanning optical system capable of making the curvature of the field at the light collecting point smaller and at the same time effectively rectifying an error in the inclination of image on a deflection device by adopting a scanning speed correcting means which can be readily manufactured and capable of improving manufacturing accuracy in place of expensive and limited availability of fθ lens, a parabolic mirror and the like which heretofore have been proposed.

Another object of the present invention is to provide a light beam scanning optical system capable of effectively rectifying an error in the inclination of image by the use of a cylindrical lens arranged in front or behind the deflection device, and at the same time most advantageously rectifying the fθ characteristic in the scanning operation with the use of a combination of cylindrical lens provided behind the deflection device and cylindrical mirror or spherical mirror.

Further object of the present invention is to provide a light beam scanning optical system capable of obtaining higher efficiency by specially designing the shape, size and positional relationship of the parts of optical system.

These and other objects and features of the present invention will become more apparent from the following description taken in conjunction with the accompanying drawings which illustrate specific embodiments of the invention.

BRIEF DESCRIPTION OF THE DRAWINGS

FIGS. 18 through 22 are graphs showing aberrations on the light collecting surface in each experimental example of the third embodiment of the present invention. In the (a) in each graph, the horizontal axis shows an angle of deflection and the vertical axis a degree of distortion, and in the (b), the horizontal axis shows an angle of deflection and the vertical axis a degree of curvature.

It is to be noted that like members and portions are designated by like numerals, and repeated descriptions are omitted.

DESCRIPTION OF PREFERRED EMBODIMENT

Some of the embodiments of the present invention will now be described referring to the accompanying drawings.

Figure 1:
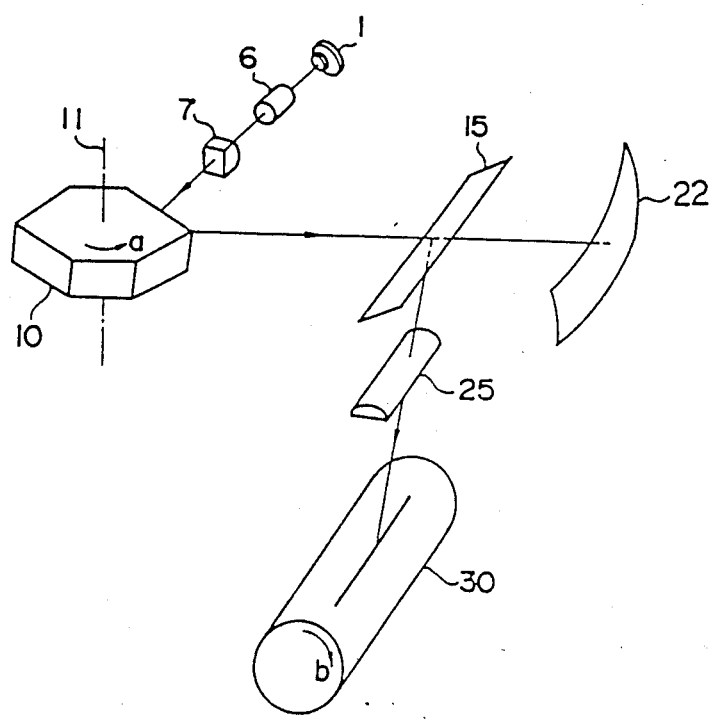
FIG. 1 is a perspective view showing the schematic structure of a first embodiment of the present invention which is applied to a laser beam printer.

FIG. 1 shows a first embodiment of the present invention which is applied to a laser beam printer. The numeral 1 in the figure designates a semiconductor laser which is intensely modulated by an unillustrated control circuit and radiates an emitting luminous flux provided with image information.

The emitted luminous flux is rectified to a convergent luminous flux by passing through a collimator lens 6. The convergent luminous flux further converges on straight line in the direction perpendicular to a rotation axis of a polygon mirror 10 (in the direction of beam scanning) by passing through a cylindrical lens 7. The luminous flux passed through the cylindrical lens 7 thus converges on a straight line facing the direction of rotation of the polygon mirror 10 at the vicinity of reflective facet of the polygon mirror 10.

The polygon mirror 10 is rotatively driven by an unillustrated motor at a constant speed in the direction of an arrow a, centering on a shaft 11. Accordingly, the convergent luminous flux emitted from the cylindrical lens 7 is successively reflected on the facet of the polygon mirror 10 and is deflected at an equiangular velocity. The luminous flux after deflection permeates a beam splitter 15, and is then reflected on the side of concave surface of a cylindrical mirror 20, which is further reflected by the beam splitter 15 and is collected onto the surface of photoconductor 30 through a cylindrical lens 25. The collected luminous flux at this stage is scanned at a uniform velocity in the axial direction of the photoconductor 30, which is called main scanning. While, the photoconductor 30 is rotatively driven at a constant speed in the direction of arrow b, and the scanning by this rotation is called sub-scanning.

Figure 2:
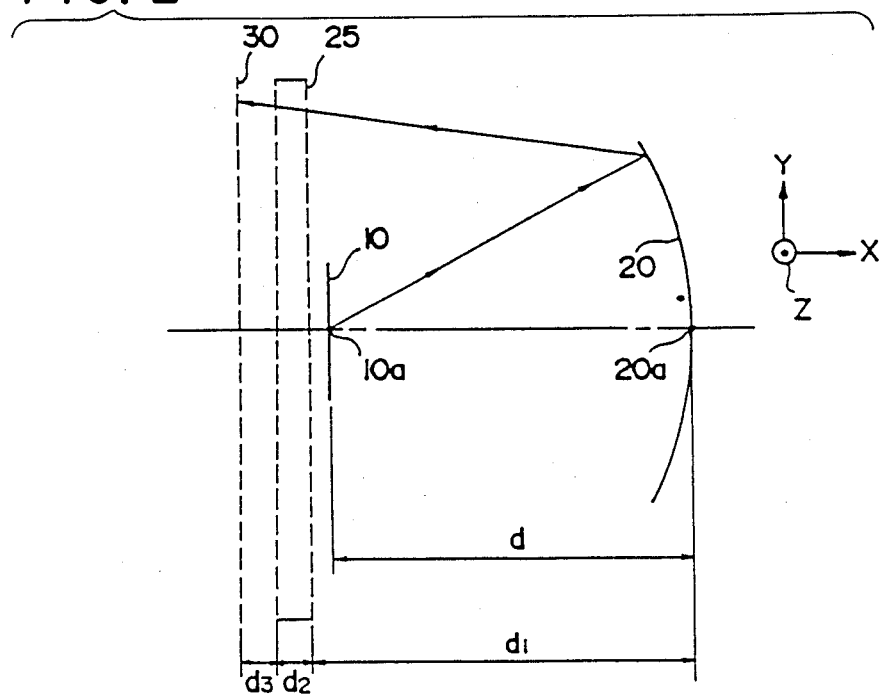
FIGS. 2 and 3 are a plan view and a side elevation view schematically illustrating light path of the optical system in FIG. 1.
Figure 3:
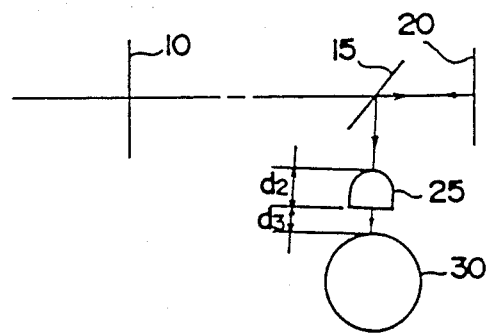
Figure 4A:
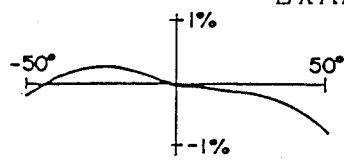
FIGS. 4 through 7 are graphs showing aberrations on the light collecting surface in each experimental example of the first embodiment of the present invention. In the (a) in each graph, the horizontal axis shows an angle of deflection and the vertical axis a degree of distortion, and in the (b), the horizontal axis shows angle of deflection and the vertical axis degree of curvature.
Figure 4A:
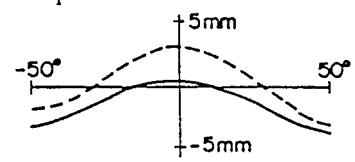
Figure 5A:
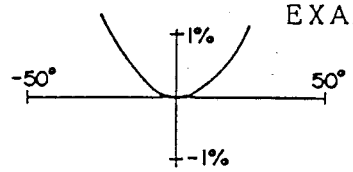
Figure 5A:
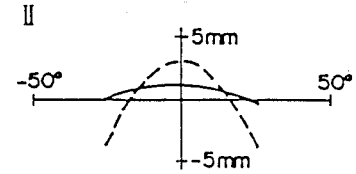
Figure 6A:
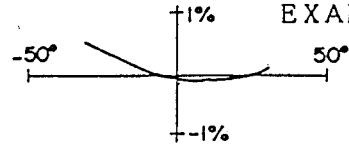
Figure 6A:
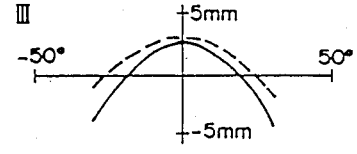
Figure 7A:
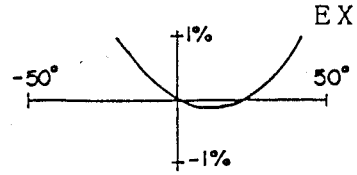
Figure 7A:
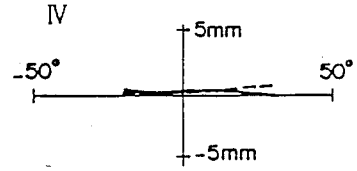
Figure 9:
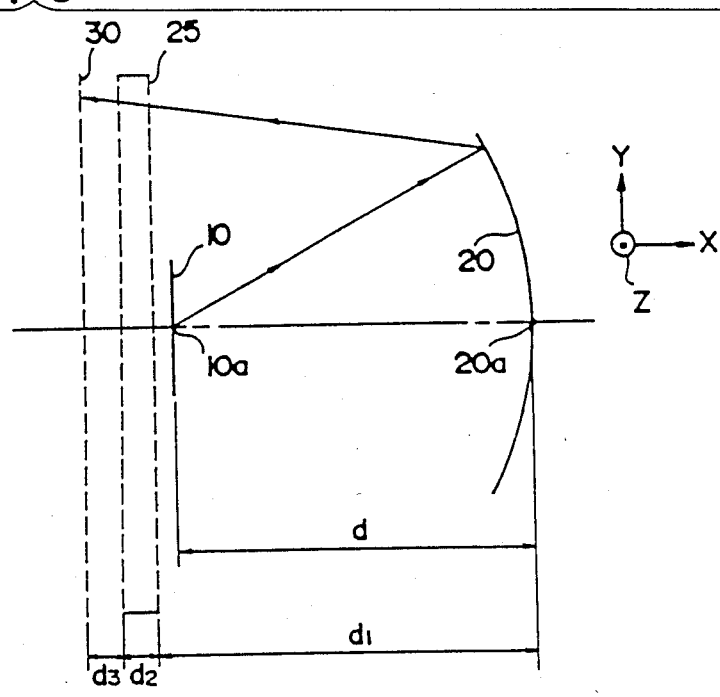
FIGS. 9 and 10 are a plan view and a side elevation view schematically showing light path of the optical system in FIG. 8.

In such a light beam scanning optical system, an image (an electrostatic latent image) is formed on the surface of photoconductor 30 by intense modulation of the semiconductor laser 1 with the main and sub-scanning. As shown in FIG. 2, in place of the conventional fθ lens, the cylindrical mirror 20 and cylindrical lens 25 rectify the scanning speed to be uniform over the range from the center to both edges of scanning area in the main scanning direction. The cylindrical mirror 20 is provided with a predetermined curvature on the deflection plane and the curvature of surface, perpendicular to the deflection plane, is made infinity.

The cylindrical lens 25 disposed in the light path between the cylindrical mirror 20 and the photoconductor 30 rectifies an error of image inclination of the polygon mirror 10 and at the same time lessens curvature of the field. In other words, the luminous flux is rectified in the direction perpendicular to the main scanning direction to a level image plane in the vicinity of a light collecting point.

If there occurs a tilt error on each reflective facet of the polygon mirror 10, a scanning line on the photoconductor 30 slips in the direction of sub-scanning and irregular pitch is produced on an image. The error by the inclination of image can be rectified by setting each reflective facet of the polygon mirror 10 and the light collecting surface of the photoconductor 30 in a conjugate relation produced by an optical system in the section perpendicular to the deflection plane by the polygon mirror 10. In the present invention, a luminous flux is collected onto the polygon mirror 10 by the cylindrical lens 7, while each reflective facet of the polygon mirror 10 and the surface of the photoconductor 30 are arranged to maintain the conjugate relation by the cylindrical lens 25.

In this embodiment, it is further arranged to rectify an emitting luminous flux to a convergent luminous flux by the collimator lens 6 so that the curvature of the field in the vicinity of the photoconductor 30 can be rectified. In other words, when a convergent luminous flux enters a polygon mirror 10 (the same as those of other rotative deflection devices), the light collecting point on the polygon mirror 10 after reflection becomes almost a circular arc centering on the point of reflection and forms a curvature of the field if there is no optical members behind the polygon mirror 10. The curvature of the field forms concaved state in the direction of incident light. The distance between the cylindrical mirror 20 and the image plane is changed according to the state of convergence of incident light. The curvature of the field is also changed by variation of the distance. Practically, the curvature of the field made by the concave plane of the cylindrical mirror 20 is rectified by the curvature of the field made by the convergent luminous flux to result in making the curvature of the field at the light collecting surface smaller and the level of the image plane is improved.

In this regard, the cylindrical lens 25 is also provided with the same function to lessen the curvature of the field. When the curvature of the field becomes smaller, the variation in the diameter of convergent luminous flux caused by the difference in scanning position (image height) becomes smaller, and an optical system can be utilized in wider angles and image can be more densely produced since the diameter of convergent luminous flux can be made smaller.

As shown in FIG. 2, in addition to the relationship between the distance d from a point of deflection 10a of the polygon mirror 10 to the vertex 20a of the cylindrical mirror 20 and the radius of curvature $R_Ma$ on deflection plane of the cylindrical mirror 20, the relationship between the radius of curvature $R_Ma$ and the distance s (not shown) from the point of deflection 10a to a light collecting point after deflection at the polygon mirror 10 and also the relationship among the radius of curvature $R_Ma$ and the thickness $d_2$ of the cylindrical lens 25 and the distance $d_3$ from the projection surface of the cylindrical lens 25 to the photoconductor 30 are set to preferably fulfill the following equations.

$$|s/R_Ma| > 0.5 \tag{1}$$

$$0.15 < d/|R_Ma| < 0.45 \tag{2}$$

$$(|d_2| + |d_3|)/|R_Ma| < 0.45 \tag{3}$$

wherein $d_1$ in FIG. 2 shows a distance from the vertex 20a of the cylindrical mirror 20 to incident surface of the cylindrical lens 25.

When the above equations (1), (2) and (3) are fulfilled, satisfactory distortional characteristics as well as satisfactory level of image plane can be obtained over wide range of angles. The minimum and maximum values in each one of the above equations are set within the experientially permissible range of image distortion on the photoconductor 30.

If the value exceeds the minimum limit in the equation (1), the image plane approaches the cylindrical mirror 20 and it makes it difficult to dispose the mirror 20 and the distortional characteristic becomes worse.

On the other hand, if the value exceeds the minimum limit in the equation (2), positive distortion is increased according to the increment of angle of deflection to result in the elongation of image at both edges in the main scanning direction (in the neighborhood of scan starting and scan ending positions). If the value exceeds the maximum limit, negative distortion is increased according to the increment of angle of deflection to result in the shrinkage of image at both edges in the main scanning direction and the curvature of the field further becomes large or the distortional characteristic becomes worse. If the value exceeds the maximum limit in the equation (3), the curvature of the field becomes large.

The constructional data in the experimental examples I, II, III and IV in the first embodiment of the present invention are shown in Table 1, wherein the diameter of an inscribed circle of the polygon mirror 10 is set at 23.5 mm.

A dotted line shows curvature of the field by a luminous flux in the deflection plane and a solid line shows curvature of the field by a luminous flux in the vertical plane against the deflection plane.

Figure 8:
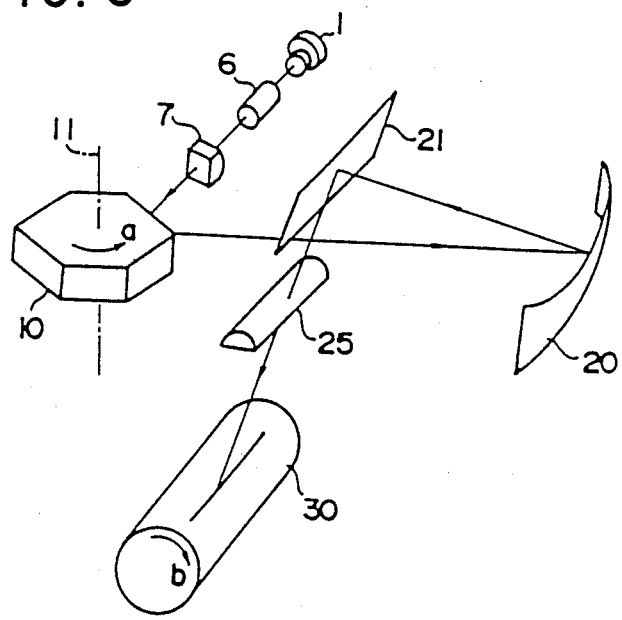
FIG. 8 is a perspective view illustrating the schematic structure of a second embodiment of the present invention.

A second embodiment of the present invention is illustrated in FIG. 8. As it is clear from FIGS. 8 and 10, a cylindrical mirror 20 is disposed with inclination of $\theta_1$ around an axis parallel to the main scanning direction, which is different from the first embodiment of the present invention. By inclining the cylindrical mirror 20 in such a manner, the luminous flux from a polygon mirror 10 is reflected by the cylindrical mirror 20 to the different direction from the incidence (angle $\theta_2$ - two times as much as the angle of inclination $\theta_1$) without the necessity of semi-pervious means like the beam splitter 15 used in the first embodiment of the present invention. The light can thus be collected directly or by providing a turning mirror 21 onto the surface of photoconductor through a cylindrical lens 25.

Figure 11:
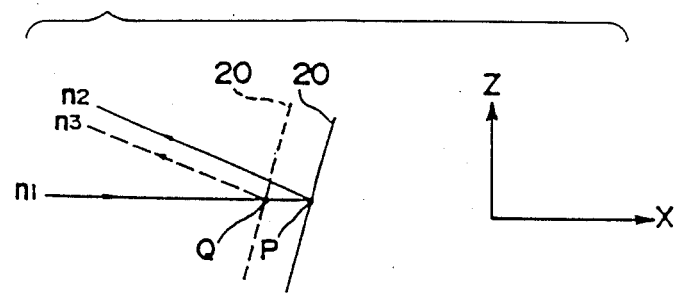
FIG. 11 is a partial side elevation view for explaining the curve of a scanning line by an inclination of a cylindrical mirror.

When the cylindrical mirror 20 is inclined, there occurs a curve on a scanning line, the cause of which will now be described with reference to FIG. 11. In the figure, an optical axis in the surface perpendicular to a deflection plane is shown, and the point P shows a reflection point of the main beam of light when angle of deflection is 0°, while the point Q shows a reflection point of the main beam of light when angle of deflection is $\theta$.

The cylindrical mirror 20 has a curvature in the surface of deflection plane, and therefore, reflection point slips in the direction of axis X when angle of deflection changes from 0° to $\theta$. Further, the reflection light n3 at angle of deflection $\theta$ against the incident light n1 slips in

TABLE 1

|  | EXPERIMENTAL EXAMPLE | | | |
| --- | --- | --- | --- | --- |
|  | I | II | III | IV |
| Radius of Curvature of Cylindrical Mirror on deflection plane ($R_M$ a) mm | −200 | −200 | −200 | −200 |
| Radius of Curvature of Cylindrical Mirror on surface perpendicular to deflection plane ($R_M$ b) mm | ∞ | ∞ | ∞ | ∞ |
| Distance from Point of Deflection to Light Collecting Point after reflection at polygon mirror (s) mm | 378 | 678 | 378 | 120 |
| Distance from Point of Deflection to Cylindrical Mirror (d) mm | 55 | 35 | 50 | 80 |
| Distance from Cylindrical Mirror to Plane of Incidence of Cylindrical Lens ($d_1$) mm | 40 | 65 | 15 | 10 |
| Thickness of Cylindrical Lens ($d_2$) mm | 5 | 5 | 5 | 5 |
| Distance from Plane of Projection of Cylindrical Lens to Light Collecting Point of Photoconductor ($d_3$) mm | 30 | 15 | 55 | 15 |
| Distance from Cylindrical Mirror to Photoconductor mm | 75 | 85 | 75 | 30 |
| Radius of Curvature of Cylindrical Lens on surface perpendicular of deflection plane on the side of incidence ($R_a$) mm | 12 | 8 | 15.3 | 7.5 |
| Radius of Curvature of Cylindrical Lens on surface perpendicular to deflection plane on the side of projection ($R_b$) mm | ∞ | ∞ | ∞ | ∞ |
| Refractive Index of Cylindrical Lens | 1.48457 | 1.48457 | 1.48457 | 1.48457 |
| $|s/R_M a|$ | 1.89 | 3.39 | 1.89 | 0.60 |
| $d/|R_M a|$ | 0.275 | 0.175 | 0.25 | 0.40 |
| $(|d_2| + |d_3|)/|R_M a|$ | 0.175 | 0.10 | 0.30 | 0.10 |

Figure 10:
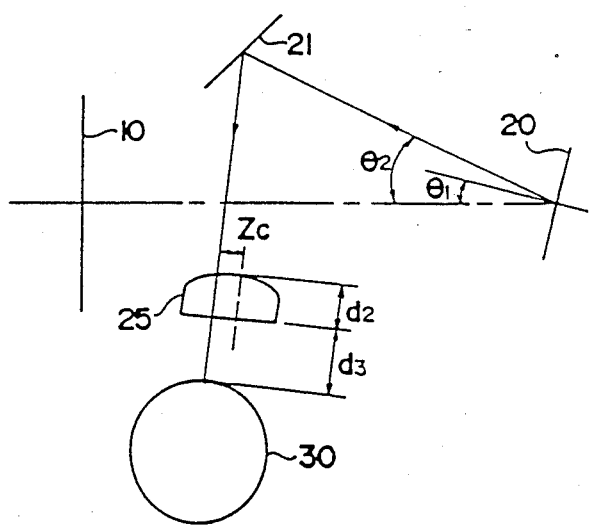

The aberrations at the light collecting surface of photoconductor in each one of the above experimental examples I, II, III and IV are shown in FIGS. 4 through 7. In the firgures (a), angle of deflection is shown by horizontal axis and degree of distortion by vertical axis, while in the figures (b), angle of deflection is shown by horizontal axis and degree of curvature by vertical axis.

the direction of axis Z against the reflection light n2 at angle of deflection 0°. The slip varies according to angle of deflection $\theta$, and the reflection lights n2 and n3 are not contained in the same plane. The scanning line is, therefore, curved in the direction of axis Z in the surface perpendicular to the optical axis. However, this sort of curve on the scanning line can be rectified by the cylindrical lens 25. In other words, if it is arranged to make the image formed by the cylindrical lens 25 shrink in the sub-scanning direction, the curve on the scanning line is also shrunk in the sub-scanning direction. For further correction of curve on the scanning line, it may also be considered to shift the cylindrical lens 25 (amount of shift is shown by Zc) in the direction perpendicular to light path as shown in FIG. 10.

The other construction is the same as that of the first embodiment of the present invention. In the second embnodiment of the present invention, the relationship among the equations (1), (2) and (3) are also appropriated. Especially, when the value exceeds the maximum limit in the equation (3), not only the curvature of the field but the curve on the scanning line becomes large.

The constructional data in the experimental examples V, VI and VII in the second embodiment of the present invention are shown in Table 2, wherein the diameter of inscribed circle of the polygon mirror 10 is set at 23.5 mm as in the first embodiment of the present invention.

in the direction perpendicular to deflection plane on scanning line.

In case of the first and second embodiments of the present invention, by providing a cylindrical mirror 20 and a cylindrical lens 25 in the light path extending from the polygon mirror 10 to the photoconductor 30 so as to fulfill the above equations (1), (2) and (3), the scanning speed in the main scanning direction can be uniformly rectified, and an error in the inclination of image on each reflective facet of polygon mirror 10 is also rectified. Moreover, irregular pitch of image in the direction of sub-scanning is rectified, and satisfactory distortional characteristic as well as satsifactory level on the image plane can be obtained over wide a range of angles at the light collecting surface.

The cylindrical mirror 20 can be prepared by grinding and cutting a large base material into a predetermined width in the direction perpendicular to the deflection plane. It can also be cut into a number of pieces, and they can be ground at the same time. Compared with the conventional $f\theta$ lens, it can be easily manufactured with improved manufacturing accuracy. As a whole, it can be utilized as an inexpensive and highly

TABLE 2

|  | EXPERIMENTAL EXAMPLE | | |
| --- | --- | --- | --- |
|  | V | VI | VII |
| Radius of Curvature of Cylindrical Mirror on deflection plane ($R_M a$) mm | −200 | −200 | −200 |
| Radius of Curvature of Cylindrical Mirror on surface perpendicular to deflection plane ($R_M b$) mm | ∞ | ∞ | ∞ |
| Distance from Point of Deflection to Light Collecting Point after reflection at polygin mirror (s) mm | 378 | 378 | 378 |
| Distance from Point of Deflection to Cylindrical Mirror (d) mm | 55 | 40 | 80 |
| Distance from Cylindrical Mirror to Plane of Incidence of Cylindrical Lens ($d_1$) mm | 40 | 55 | 35 |
| Thickness of Cylindrical Lens ($d_2$) mm | 5 | 5 | 5 |
| Distance from Plane of Projection of Cylindrical Lens to Light Collecting Point of Photoconductor ($d_3$) mm | 30 | 15 | 25 |
| Distance from Cylindrical Mirror to Photoconductor mm | 75 | 75 | 65 |
| Radius of Curvature of Cylindrical Lens on surface perpendicular to deflection plane on the side of incidence ($R_a$) mm | 12.3 | 8.0 | 10.3 |
| Radius of Curvature of Cylindrical Lens on surface perpendicular to deflection plane on the side of projection ($R_b$) mm | ∞ | ∞ | ∞ |
| Refractive Index of Cylindrical Lens | 1.48457 | 1.48457 | 1.48457 |
| Angle of Inclination of Cylindrical Mirror ($\theta_1$) | 4° | 4° | 4° |
| $\|s/R_M a\|$ | 1.89 | 1.89 | 1.89 |
| $d/\|R_M a\|$ | 0.275 | 0.20 | 0.4 |
| $(\|d_2\| + \|d_3\|)/\|R_M a\|$ | 0.175 | 0.10 | 0.15 |

Figure 12B:
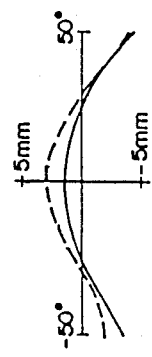
FIGS. 12 through 14 are graphs showing aberrations on the light collecting surface in each experimental example of the second embodiment of the present invention. In the (a) in each graph, the horizontal axis shows angle of deflection and the vertical axis degree of distortion, and in the (b), the horizontal axis shows angle of deflection and the vertical axis degree of distortion on the scanning line.
Figure 12C:
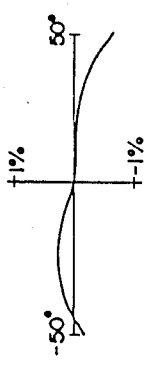
Figure 13B:
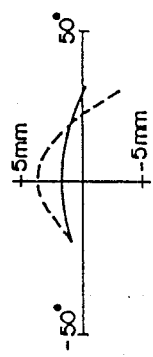
Figure 13C:
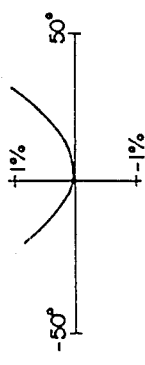
Figure 14B:
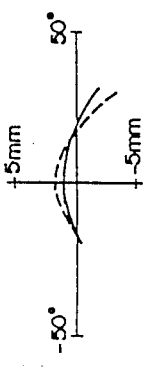
Figure 14C:
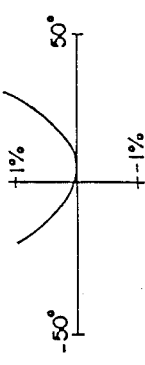

The aberrations at the light collecting surface of the photoconductor in each one of the above experimental examples V, VI and VII are shown in FIGS. 12 through 14. In the figures (a), angle of deflection is shown by horizontal axis and degree of distortion by vertical axis, while in the figures (b), angle of deflection is shown by horizontal axis and degree of curvature by vertical axis. A dotted line shows curvature of the field by a luminous flux in the deflection plane and a solid line shows curvature of the filed by a luminous flux in the vertical plane against the deflection plane. In the figures (c), the horizontal axis shows angle of deflection and the vertical axis degree of distortion on scanning line thereby indicating the positional slip, i.e. the curve in scanning line, efficient scanning optical system since the material can be widely selected as it need not be transparent. The light path is turned over by the cylindrical mirror 20 itself and the whole optical system becomes compact in size. Moreover, compared with parabolic mirror and elliptical mirror, it can be advantageously manufactured with improved manufacturing accuracy in compact size as compared with the conventional concave reflector.

Especially in the second embodiment of the present invention, a cylindrical mirror 20 is inclined around an axis parallel to the main scanning direction so that light can be collected onto the photoconductor without providing semi-pervious means. The disposition of optical members can thus be considered in more varied manners and diminution of the light amount is lessened.

Figure 15:
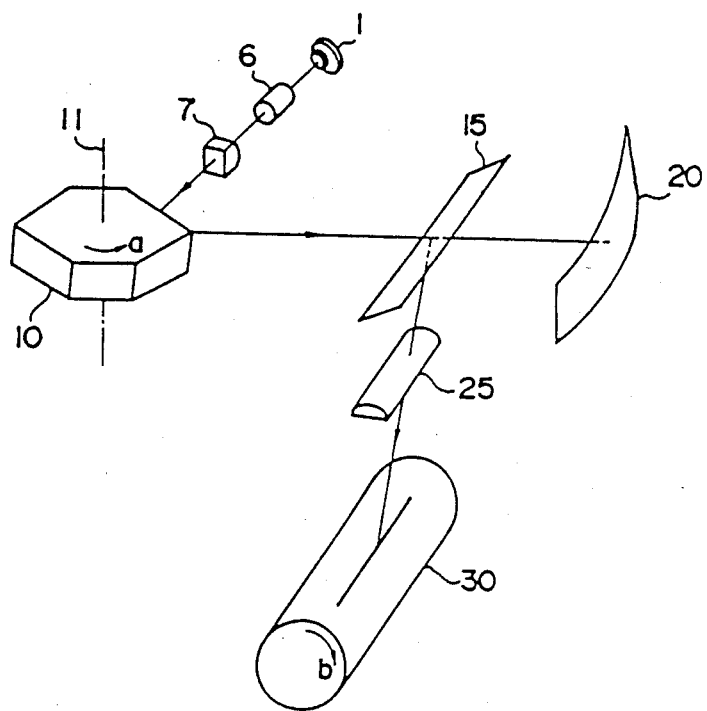
FIG. 15 is a perspective view illustrating a schematic structure of a third embodiment of the present invention.

A third embodiment of the present invention is illustrated in FIG. 15. In this embodiment, a luminous flux passed through a beam splitter 15 is turned over at the concave surface of a spherical mirror 22 and is then collected on the surface of photoconductor 30, which is different from the first embodiment of the present invention. Thus, the curvature of the field perpendicular to the main scanning direction at a light collecting point is advantageously lessened.

Figure 16:
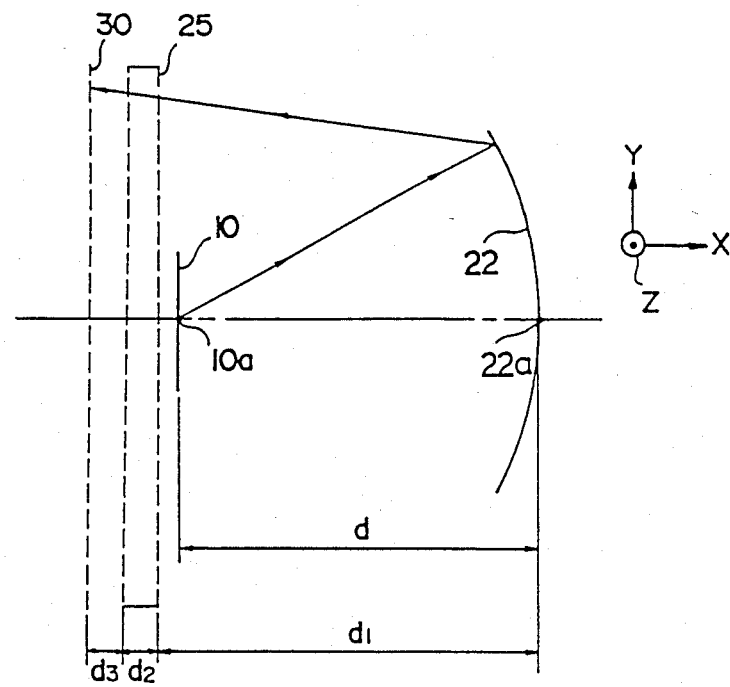
FIGS. 16 and 17 are a plan view and a side elevation view schematically showing light path of the optical system in FIG. 15.
Figure 17:
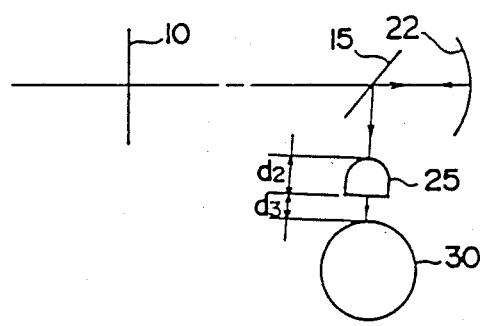
Figure 24:
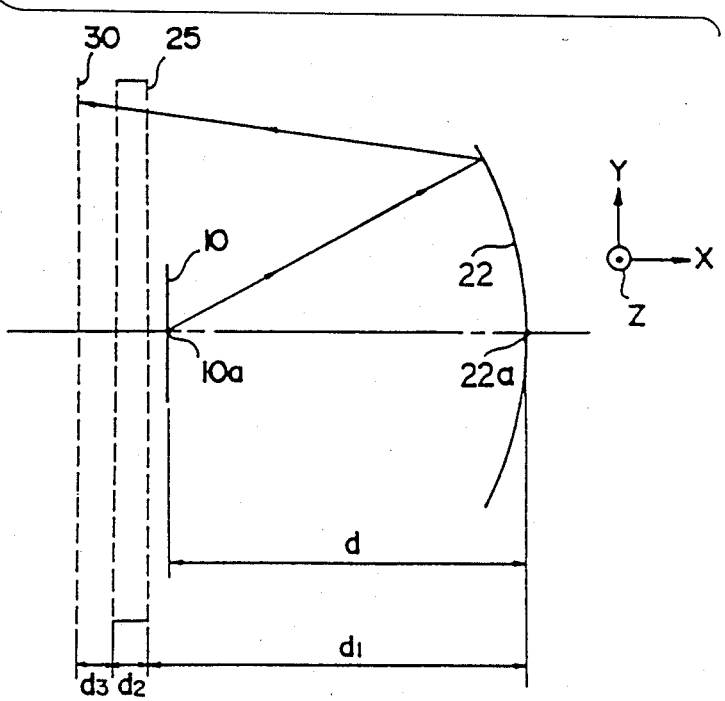
FIGS. 24 and 25 are a plan view and a side elevation schematically showing light path of the optical system in FIG. 23.

Concrete examples of this embodiment are shown in the following experimental examples VIII thru XII. As shown in FIGS. 16 and 17, in addition to the relationship between the distance d from a point of deflection 10a of a polygon mirror 10 to the vertex 22a of a spherical mirror 22 and the radius of curvature $R_M$ of the spherical mirror 22, the relations between the radius of curvature $R_M$ and the distance s (not shown) from the point of deflection 10a to a light collecting point after reflection of the polygon mirror 10 and also the relationship between the radius of curvature $R_M$ and the thickness $d_2$ of a cylindrical lens 25 and the distance $d_3$ from projection surface of the cylindrical lens 25 to the photoconductor 30 are set to preferably fulfill the following equations for the same reason as that of the first embodiment of the present invention.

$$|s/R_M| > 0.5 \quad (4)$$

$$0.15 < d/|R_M| < 0.45 \quad (5)$$

$$(|d_2| + |d_3|)/|R_M| < 0.45 \quad (6),$$

wherein $d_1$ in FIG. 16 shows a distance from the vertex 22a of the spherical mirror 22 to incident surface of the cylindrical lens 25.

The constructional data in the experimental examples VIII, IX, X, XI and XII in the third embodiment of the present invention are shown in Table 3, wherein the diameter of inscribed circle of the polygon mirror 10 is set at 23.5 mm as in the first embodiment of the present invention.

TABLE 3

|  | EXPERIMENTAL EXAMPLE | | | | |
| --- | --- | --- | --- | --- | --- |
|  | VIII | IX | X | XI | XII |
| Radius of Curvature of Spherical Mirror ($R_M$) mm | −200 | −200 | −200 | −200 | −200 |
| Distance from Point of Deflection to Light Collecting Point after reflection at polygon mirror (s) mm | ∞ | 378 | 228 | 338 | 108 |
| Distance from Point of Deflection to Spherical Mirror (d) mm | 35 | 55 | 80 | 60 | 70 |
| Distance from Spherical Mirror to Plane of Incidence of Cylindrical Lens ($d_1$) mm | 62 | 40 | 30 | 15 | 10 |
| Thickness of Cylindrical Lens ($d_2$) mm | 5 | 5 | 5 | 5 | 5 |
| Distance from Plane of Projection of Cylindrical Lens to Light Collecting Point of Photoconductor ($d_3$) mm | 30 | 30 | 30 | 55 | 15 |
| Distance from Spherical Mirror to Photoconductor mm | 97 | 75 | 65 | 75 | 30 |
| Radius of Curvature of Cylindrical Lens of surface perpendicular to deflection plane on the side of incidence ($R_a$) mm | 13 | 13 | 15 | 22 | 9 |
| Radius of Curvature of Cylindrical Lens on surface perpendicular to deflection plane on the side of projection ($R_b$) mm | ∞ | ∞ | ∞ | ∞ | ∞ |
| Refractive Index of Cylindrical Lens | 1.48457 | 1.48457 | 1.48457 | 1.48457 | 1.48457 |
| $|s/R_M|$ | ∞ | 1.89 | 1.14 | 1.69 | 0.54 |
| $d/|R_M|$ | 0.175 | 0.275 | 0.40 | 0.30 | 0.35 |
| $(|d_2| + |d_3|)/|R_M|$ | 0.175 | 0.175 | 0.175 | 0.30 | 0.10 |

The aberrations at the light collecting surface of the photoconductor in each one of the above experimental examples VIII, IX, X, XI and XII are shown in FIGS. 18 through 22. In the figures (a), angle of deflection is shown by horizontal axis and degree of distortion by vertical axis, while in the figures (b), angle of deflection is shown by horizontal axis and degree of curvature by vertical axis. A dotted line shows curvature of the field by a luminous flux in the deflection plane and a solid line shows curvature of the field by a luminous flux in the vertical plane against the deflection plane.

Figure 25:
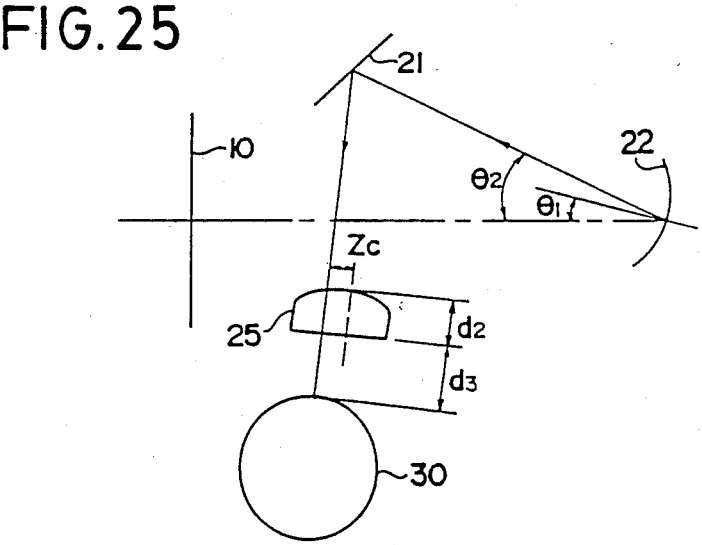
Figure 23:
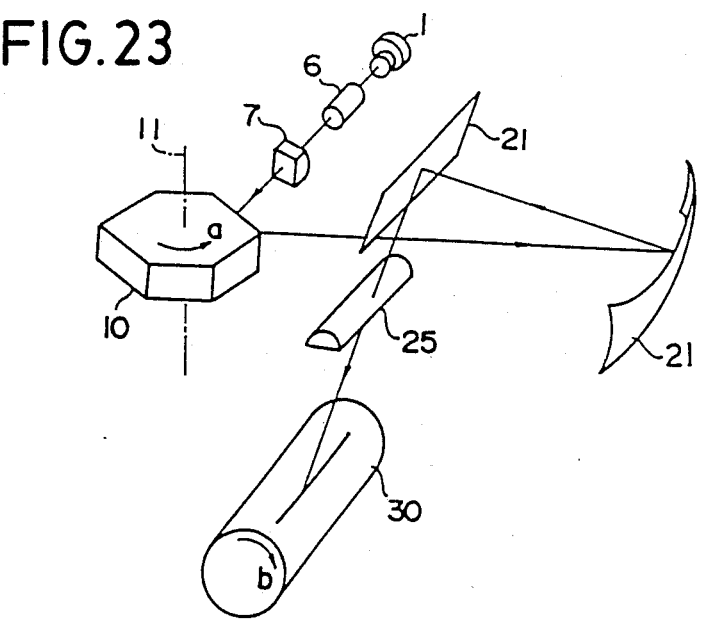
FIG. 23 is a perspective view illustrating a schematic structure of a fourth embodiment of the present invention.

A fourth embodiment of the present invention is illustrated in FIG. 23. In this embodiment, as it is clear from FIGS. 23 and 25, a spherical mirror 22 is disposed with inclination of $\theta_1$ around an axis parallel to the main scanning direction, which is different from the third embodiment of the present invention. By inclining the spherical mirror 22 in such a manner, the luminous flux from a polygon mirror 10 is reflected at the spherical mirror 20 to the different direction from the incidence (angle $\theta_2$ -two times as much as the angle of inclination $\theta_1$) without the necessity of a semi-pervious means like the beam splitter 15 used in the first embodiment of the present invention. The light can thus be collected directly or by providing a turning mirror 21 onto the surface of the photoconductor through a cylindrical lens 25.

Figure 26:
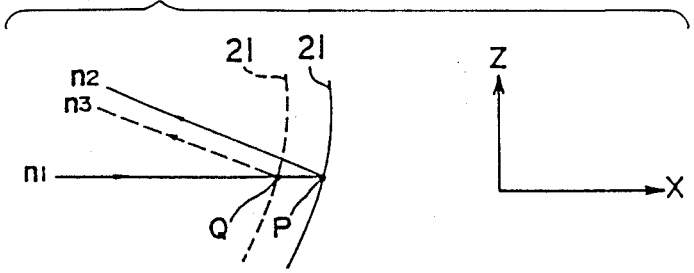
FIG. 26 is a partial side elevation view for explaining the curve of the scanning line by inclination of a spherical mirror.

When the spherical mirror 22 is inclined, there occurs a curve on a scanning line. This is because the spherical mirror 22 has a curvature in the direction of deflection like the cylindrical mirror and the reflective point slips in the direction of axis X when angle of deflection changes from 0° to $\theta$. Such a state is illustrated in FIG. 26, however, a detailed description is omitted since it has already been described in the second embodiment of the present invention.

The other construction is the same as that of the third embodiment of the present invention. In the fourth embodiment of the present invention, the relationship among the equations (4), (5) and (6) are also appropriate. Especially when the value exceeds the maximum limit in the equation (6), not only the curvature of the field but the curve on the scanning line becomes large.

The constructional data in the experimental examples XIII, XIV and XV in the fourth embodiment of the present invention are shown in Table 4, wherein the diameter of an inscribed circle of polygon mirror 10 is set at 23.5 mm as in the first embodiment of the present invention.

TABLE 4

|  | EXPERIMENTAL EXAMPLE | | |
| --- | --- | --- | --- |
|  | XIII | XIV | XV |
| Radius of Curvature of Spherical Mirror ($R_M$) mm | −200 | −200 | −200 |
| Distance from Point of Deflection to Light Collecting Point after reflection at polygon mirror (s) mm | 378 | 378 | 228 |
| Distance from Point of Deflection to Spherical Mirror (d) mm | 55 | 40 | 80 |
| Distance from Spherical Mirror to Plane of Incidence of Cylindrical Lens ($d_1$) mm | 40 | 60 | 30 |
| Thickness of Cylindrical Lens ($d_2$) mm | 5 | 5 | 5 |
| Distance from Plane of Projection of Cylindrical Lens to Light Collecting Point of Photoconductor ($d_3$) mm | 30 | 10 | 30 |
| Distance from Spherical Mirror to Photoconductor mm | 75 | 75 | 65 |
| Radius of Curvature of Cylindrical Lens on surface perpendicular to deflection plane on the side of incidence ($R_a$) mm | 14 | 6 | 15 |
| Radius of Curvature of Cylindrical Lens on surface perpendicular to deflection plane of the side of projection ($R_b$) mm | $\infty$ | $\infty$ | $\infty$ |
| Refractive Index of Cylindrical Lens | 1.48457 | 1.48457 | 1.48457 |
| Angle of Inclination of Spherical Mirror ($\theta_1$) | 5° | 5° | 5° |
| $|s/R_M|$ | 1.89 | 1.89 | 1.14 |
| $d/|R_M|$ | 0.275 | 0.20 | 0.4 |
| $(|d_2| + |d_3|)/|R_M|$ | 0.175 | 0.075 | 0.175 |

Figure 27C:
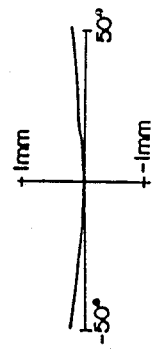
FIGS. 27 through 29 are graphs showing aberrations on the light collecting surface in each experimental example of the fourth embodiment of the present invention. In the (a) in each graph, the horizontal axis shows angle of deflection and the vertical axis degree of distortion, and in the (b), the horizontal axis shows angle of deflection and the vertical axis degree of distortion on the scanning line.
Figure 27B:
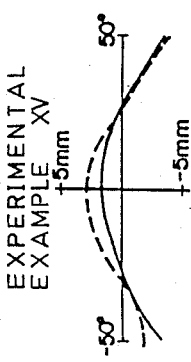
Figure 27A:
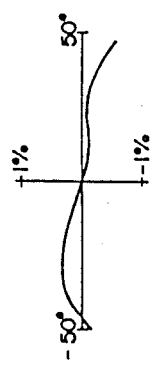
Figure 28C:
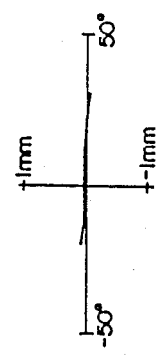
Figure 28B:
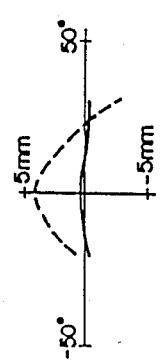
Figure 28A:
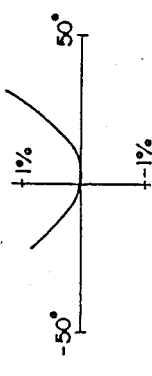
Figure 29C:
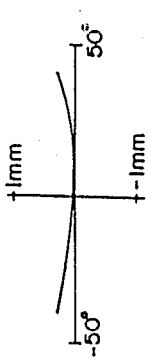
Figure 29B:
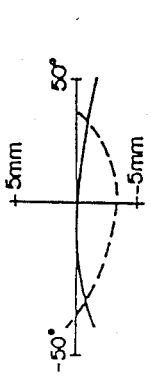
Figure 29A:
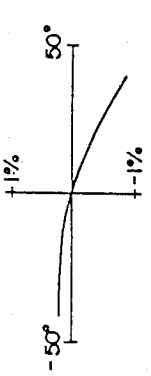

The aberrations at the light collecting surface of the photoconductor in each one of the above experimental examples XIII, XIV and XV are shown in FIGS. 27 through 29. In the figures (a), angle of deflection is shown by horizontal axis and degree of distortion by vertical axis, while in the figures (b), angle of deflection is shown by horizontal axis and degree of curvature by vertical axis. A dotted line shows curvature of the field by a luminous flux in the deflection plane and a solid line shows curvature of the field by a luminous flux in the vertical plane against the deflection plane. In the figures (c), horizontal axis shows angle of deflection on the scanning line thereby indicating positional slip, i.e. the curve in the scanning line, in the direction perpendicular to the deflection plane of the scanning line.

The light beam scanning optical system related to the present invention is not limited to each one of the embodiments described above, and various changes and modifications within the scope of the principles may be employed.

For instance, the polygon mirror 10 utilized in the embodiments as a deflection device may be replaced with various other means if it is capable of deflecting a luminous flux at an equiangular velocity on a plane. Besides the semiconductor laser, other laser emitting means or a spot light source may be utilized as a light source.

In each one of the embodiments described above, the shifting of cylindrical mirror and spherical mirror in the main scanning direction (direction Y shown in FIGS. 2, 9, 16 and 24) is not referred to. However, in consideration of easiness in aberration correction and their positioning, they can be shifted in the main scanning direction. For instance, as in the experimental example I in the first embodiment (refer to FIG. 4), as in the experimental example V in the second embodiment (refer to FIG. 12), as in the experimental example VIII in the third embodiment (refer to FIG. 18) and as in the experimental example XIII in the fourth embodiment (refer to FIG. 27), when the distortional aberrations are not symmetrical, the distortional aberrations can be further reduced by shifting the cylindrical mirror or spherical mirror as described.

In each one of the above embodiments, an emitting luminous flux radiated from a semiconductor laser is rectified to a convergent luminous flux by a collimator lens, however, it may be arranged to rectify the emitting luminous flux merely to a parallel luminous flux.

The curvature $R_M$ of spherical mirror 21 is the same in any direction and contains the condition of curvature $R_{Ma}$ of cylindrical mirror 20 in the first embodiment of the present invention. The equations (1) through (3) and (4) through (6) are also the same except the difference in the value of curvature $R_{Ma}$ and $R_M$. In the present invention, it can thus be said that a mirror which is provided with at least a concave surface curved in a circular arc in the direction of deflection of a luminous flux may be utilized as an optical members for rectifying the fθ characteristic by turning and collecting a luminous flux onto the photoconductor 30, thereby fulfilling the following equations.

$$|s/R| > 0.5 \tag{7}$$

$$0.15 < d/|R| < 0.45 \tag{8}$$

$$(|d_2| + |d_3|)/|R| < 0.45 \tag{9}$$

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A light beam scanning optical system, comprising:
    a light source;
    a luminous flux converging means for converging luminous flux emitted from the light source into a straight line in a direction parallel to a beam scanning plane;
    a deflection device disposed in the vicinity where a luminous flux is converged in a straight line for deflecting the converged luminous flux at an equiangular velocity;
    a mirror having a concave surface curved in a circular arc in the direction of deflection for turning and collecting luminous flux deflected by the deflection device onto the surface of a photoconductor; and
    a cylindrical lens disposed between the mirror and a light collecting point, wherein the relationship among the deflection device, mirror and cylindrical lens fulfills the following three equations.

$$|s/R| > 0.5$$

$$0.15 < d/|R| < 0.45$$

$$(|d_2| + |d_3|)/|R| < 0.45,$$

wherein R is a radius of curvature of the mirror in the direction of deflection, s is a distance from a point of reflection of luminous flux directed toward the center of the scanning area by the deflection device to a light collecting point after reflection of the deflection device, d is a distance from a point of reflection of luminous flux directed toward the center of the scanning area by the deflection device to the mirror, $d_2$ is the thickness of the cylindrical lens, and $d_3$ is a distance from the plane of projection of the cylindrical lens to the light collecting surface.

2. A light beam scanning optical system as defined in claim 1, further comprising a luminous flux rectifying means for rectifying an emitted luminous flux from the light source into either a parallel luminous flux or a convergent luminous flux.

3. A light beam scanning optical system as defined in claim 2, wherein the mirror is inclined around a horizontal axis parallel to the beam scanning plane.

4. A light beam scanning optical system as defined in claim 2, wherein the mirror is shifted to one side in the direction of deflection of the luminous flux.

5. A light beam scanning optical system, comprising:
    a light source;
    a luminous flux converging means for converging luminous flux emitted from the light source in straight line in the direction parallel to beam scanning plane;
    a deflection device disposed in the vicinity where luminous flux is converged into a straight line for deflecting the converged luminous flux at an equiangular velocity;
    a cylindrical mirror for turning and collecting luminous flux deflected by the deflection device onto the surface of photoconductor; and
    a cylindrical lens disposed between the cylindrical mirror and a light collecting point, wherein the relationship among the deflection device, cylindrical mirror and cylindrical lens fulfills the following three equations.

$$|s/R_Ma| > 0.5$$

$$0.15 < d/|R_Ma| < 0.45$$

$$(|d_2| + |d_3|)/|R_Ma| < 0.45,$$

wherein $R_Ma$ is a radius of curvature of the cylindrical mirror, s is a distance from a point of reflection of luminous flux directed toward the center of scanning area by the deflection device to a light collecting point after reflection of deflection device, d is a distance from a point of reflection of luminous flux directed toward the center of scanning area by a deflection device to the cylindrical mirror, $d_2$ is the thickness of cylindrical lens and $d_3$ is a distance from plane of projection of the cylindrical lens to the light collecting surface.

6. A light beam scanning optical system as defined in claim 5, further comprising a luminous flux rectifying means for rectifying an emitted luminous flux from the light source into either a parellel luminous flux or a convergent luminous flux.

7. A light beam scanning optical system as defined in claim 6, wherein the cylindrical mirror is inclined around a horizontal axis parallel to the beam scanning plane.

8. A light beam scanning optical system as defined in claim 6, wherein the cylindrical mirror is shifted to one side in the direction of deflection of the luminous flux.

9. A light bean scanning optical system, comprising:
    a light source;
    a luminous flux converging means for converging luminous flux emitted from the light source into a straight line in the direction parallel to the beam scanning plane;
    a deflection device disposed in the vicinity where luminous flux is converged into a straight line for deflecting the converged luminous flux at an equiangular velocity;
    a spherical mirror for turning and collecting luminous flux deflected by the deflection device into the surface of the photoconductor; and
    a cylindrical lens disposed between the spherical mirror and a light collecting point, wherein the relationship among the deflection device, the spherical mirror and the cylindrical lens fulfills the following three equations.

$$|s/R_M| \geq 0.5$$

$$0.15 \leq d/|R_M| \leq 0.45$$

$$(|d_2|+|d_3|)/|R_M| \leq 0.45,$$

wherein $R_M$ is a radius of curvature of the spherical mirror, s is a distance from a point of reflection of luminous flux directed toward the center of the scanning area by the deflection device to a light collecting point after reflection of the deflection device, d is a distance from a point of reflection of luminous flux directed toward the center of the scanning area by the deflection device to the spherical mirror, $d_2$ is the thickness of the cylindrical lens, and $d_3$ is a distance from the plane of projection of the cylindrical lens to the light collecting surface.

10. A light beam scanning optical system as defined in claim 9, further comprising a luminous flux rectifying means for rectifying emitted luminous flux from the light source into either parallel luminous flux or convergent luminous flux.

11. A light beam scanning optical system as defined in claim 10, wherein the spherical mirror is inclined around a horizontal axis parallel to the beam scanning plane.

12. A light beam scanning optical system as defined in claim 10, wherein the spherical mirror is shifted to one side in the direction of deflection of the luminous flux.

* * * * *